United States Patent
Aseev et al.

(10) Patent No.: US 10,817,542 B2
(45) Date of Patent: Oct. 27, 2020

(54) USER CLUSTERING BASED ON METADATA ANALYSIS

(71) Applicant: Acronis International GmbH, Schaffhausen (CH)

(72) Inventors: Evgeny A. Aseev, Moscow (RU); Sanjeev Solanki, Singapore (SG); Stanislav Protasov, Moscow (RU); Serguei M. Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 247 days.

(21) Appl. No.: 15/907,735

(22) Filed: Feb. 28, 2018

(65) Prior Publication Data

US 2019/0266279 A1    Aug. 29, 2019

(51) Int. Cl.
  *G06F 16/215* (2019.01)
  *G06F 16/28* (2019.01)
  *G06F 21/60* (2013.01)
  *G06F 16/11* (2019.01)

(52) U.S. Cl.
  CPC .......... *G06F 16/285* (2019.01); *G06F 16/128* (2019.01); *G06F 16/215* (2019.01); *G06F 21/604* (2013.01)

(58) Field of Classification Search
  CPC .... G06F 16/128; G06F 16/1748; G06F 16/27; G06F 16/2365; G06F 16/215; G06F 16/285
  USPC .................................................. 707/692, 649
  See application file for complete search history.

(56) References Cited

U.S. PATENT DOCUMENTS

| | | | |
|---|---|---|---|
| 7,801,894 B1* | 9/2010 | Bone ....................... | G06F 16/13 707/737 |
| 2011/0252044 A1* | 10/2011 | Shin ...................... | G06F 16/335 707/749 |
| 2013/0124525 A1 | 5/2013 | Anderson | |
| 2014/0095504 A1 | 4/2014 | Soroushian | |
| 2014/0181113 A1 | 6/2014 | Kim et al. | |
| 2015/0317339 A1* | 11/2015 | Vranyes ................. | G06Q 10/00 707/695 |
| 2016/0379268 A1 | 12/2016 | Song et al. | |
| 2017/0372225 A1 | 12/2017 | Foresti | |

FOREIGN PATENT DOCUMENTS

| | | |
|---|---|---|
| CN | 106354797 A | 1/2017 |
| CN | 106446115 A | 2/2017 |

* cited by examiner

Primary Examiner — Robert W Beausoliel, Jr.
Assistant Examiner — Pedro J Santos
(74) Attorney, Agent, or Firm — Arent Fox LLP; Michael Fainberg

(57) ABSTRACT

A systems and methods of managing user data using clustering patterns based on metadata analysis. The described technique includes receiving file metadata from multiple user devices, where the file metadata is associated with data stored on the plurality of user devices associated with a plurality of users. The technique generates a user metadata fingerprint based on a plurality of user metadata record attributes contained in the file metadata, and determines clustering of the plurality of users based on the generated user metadata fingerprint. The data for the plurality of users may be stored based on the determined clustering.

12 Claims, 6 Drawing Sheets

USER CLUSTERING BASED ON METADATA ANALYSIS

FIELD OF TECHNOLOGY

The present disclosure relates generally to the field of managing user data, more specifically, to systems and methods of managing user data using clustering patterns based on metadata analysis.

BACKGROUND

Currently, there are a number of conventional methods that relate to organization of data archiving. One of these methods is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data. On the one hand, this results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the contents of the hard disk drive are archived, or stored somewhere, once. After that, only that data that has been changed, or added, since the previous backup, or since the pervious incremental backup, is actually archived. Recovery of the data from the archive typically involves merging of the original backup and the various incremental backups.

However, current data storage and backup systems have no way to differentiate user systems based on their work requirements and computer usage. Current systems then default to providing flat service to all users within an organizations and or across organizations and corporations.

SUMMARY

Thus, a system and method is disclosed herein for storing user data, and more particularly, for managing user data in a plurality of user devices machine learning and clustering based on file metadata.

According to one aspect, a computer-implemented method for managing user data in a plurality of user devices is provided. The method includes receiving, from a plurality of user devices, file metadata associated with data stored on the plurality of user devices associated with a plurality of users, and generating a user metadata fingerprint based on a plurality of user metadata record attributes contained in the file metadata. The method further includes determining clustering of the plurality of users based on the generated user metadata fingerprint, and storing data for the plurality of users based on the determined clustering.

In another aspect, wherein the plurality of user metadata record attributes is cleaned, normalized, and joined to a database of user records.

In another aspect, the method further includes, responsive to determining a first file metadata log received from a first user device is associated with a new user, generating a new user identity associated with the first user device; and responsive to determining the first file metadata log received from the first user device is associated with an existing user, appending the first file metadata log to a list of snapshots associated with the first user device.

In another aspect, the method further includes determining a group data storage and protection policy for the plurality of user devices based on the determined clustering.

In another aspect, the determined clustering includes a plurality of clusters of users across multiple corporations and organizations, and the method further includes identifying similar metadata across the multiple corporations, determining a common data storage and protection policy, and storing up the data of the plurality of user devices based on the common data storage and protection policies.

In another aspect, the method further includes, responsive to determining that a user metadata fingerprint associated with a new user device matches an existing user metadata fingerprint associated with a first user device in a same cluster, determining that the new user device belongs to a same user as the first user device.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing user data in a plurality of user devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Aspects of the present disclosure enables a storage/backup/protection system to differentiate users based on their computing file usage and cluster the users into groups within a corporation/organization or across corporations/organizations to provide better targeted data storage/protection services to user groups. For sake of illustration, the present disclosure may describe detailed aspects with respect to a data storage system, but it is understood that aspects of the present disclosure may be applied to a variety of storage-related systems, including backup systems, systems for data archiving, and data protection systems.

Figure 1:
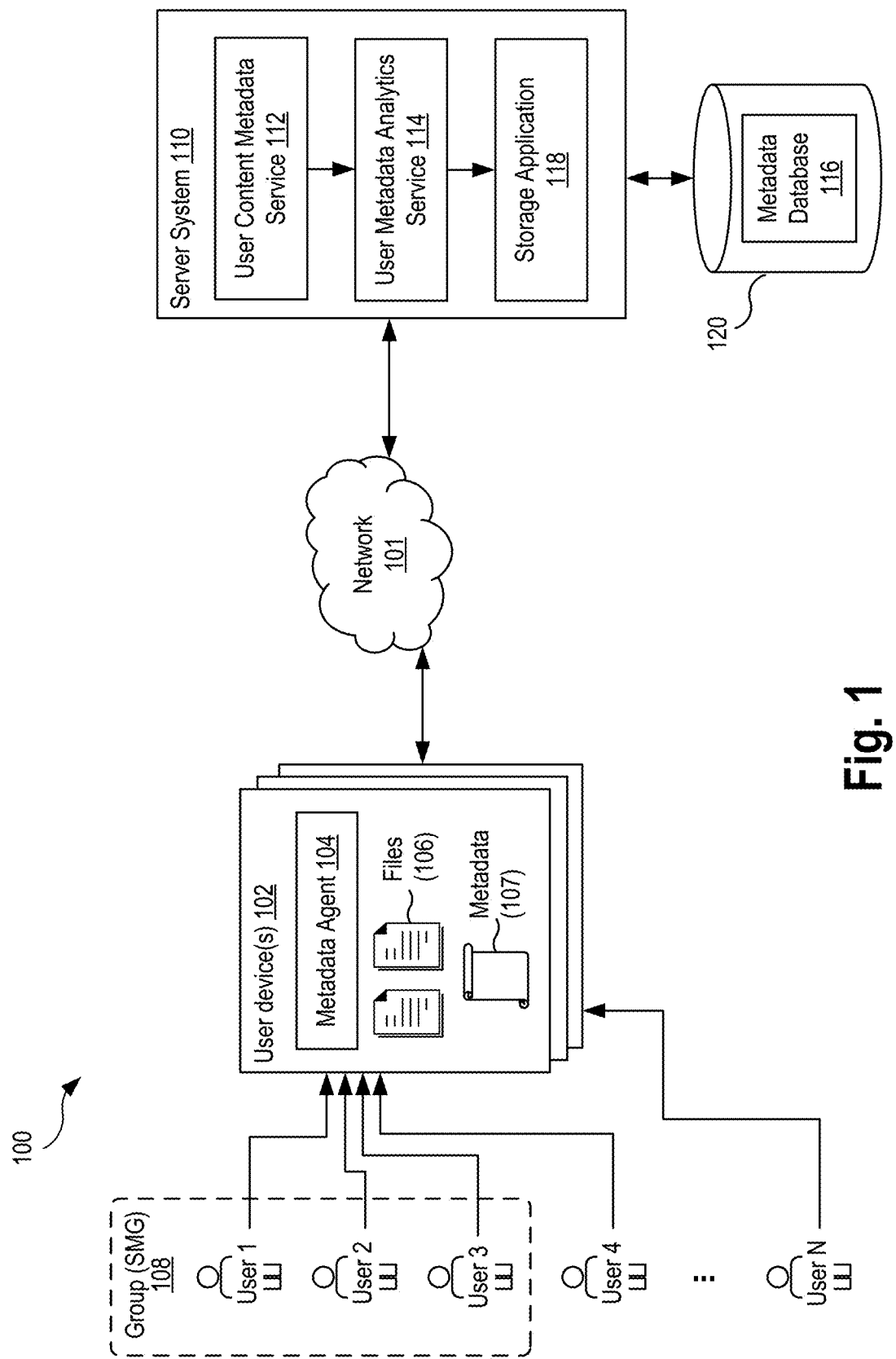
FIG. 1 is a block diagram illustrating a system for managing user data in a plurality of user devices according to an exemplary aspect.

FIG. 1 is a block diagram illustrating a system 100 for managing up user data in a plurality of user devices according to an exemplary aspect. The system 100 includes a plurality of user devices 102 operable by one or more associated users (depicted as User 1, User 2, User 3, User 4, to User N). The user devices 102 may be personal computers (PCs), workstations, laptops, notebooks, mobile device, smartphones, tablets, thin client computers, virtual machines, and other user machines. The system 100 further includes a server system 110 communicatively connected to the user devices 102 by a communications network 101 (e.g., a local network, the Internet, etc.)

In a large organization, there may be a large number of users having different roles, and each role may entail different computing needs. These users generate (e.g., by creating new files, downloading, etc.) information embodied in various types of files on their user devices on a regular basis. It has been determined that users working under similar environments or roles, such as finance, sales, human resources (HR), etc., have tendencies to generate similar information, generate information with similar characteristics, or generate information in a similar manner. Such tendencies may become the basis to group the users using metadata linked to the information.

User in an organization may generate content restricted by local group functional requirements. All such generated content may have associated metadata, which is used by a filesystem of the user device. The metadata facilitates with both understanding static and dynamic behavior of the users or with creating a user fingerprint, as described in greater detail below. The system 100 operates under the following assumptions: users working in a same local environment are expected to have similar fingerprints; users working in a different environment are expected to have dissimilar fingerprints; and users working in a similar (but not same) environment may have a certain level of similarity in their respective fingerprints. The system 100 is configured to use user's metadata to create user metadata fingerprints of individual users and later using machine learning and/or artificial intelligence techniques to model clustering users into similar user groups.

Each user device 102 may be configured to, in response to user input, create content, data, and other information depicted in FIG. 1 as one or more files 106, which may be stored in a storage device (not shown) of the user device 102. Each user device 102 may include a metadata agent 104 configured to gather metadata 107 associated with the files 106 and provide the gathered metadata 107 to a server system 110. In one aspect, the metadata agent 104 may be implemented using one or more content metadata gathering scripts that are periodically executed by the user device 102, e.g., as scheduled by a periodic metadata gathering scheduler, or as a daemon that monitors the creation of files 106. In some aspects, the metadata agent 104 may include a private data hashing script configured to encrypt or otherwise secure the metadata prior to transmission to the server system 110. In some aspects, the metadata agent 104 may include a log gathering metadata file write script configured to maintain one or more logs containing the metadata associated with files 106.

The server system 110 may include a user content metadata service 112, a user metadata analytics service 114, a metadata database 116 stored on a storage device 120, and a storage application 118. In one aspect, the user content metadata service 112 may be configured to read the user metadata log file 107, and extract one or more attributes associated with the users from the user metadata. In some aspects, the user content metadata service 112 may include an attribute execution script, and a private data hashing script. In some aspects, the user content metadata service 112 may retrieve the metadata log 107 from each user device 102, while in other aspects, the metadata log 107, or portions thereof, may be provided to the user content metadata service 112. The user content metadata service 112 may store the obtained metadata log and records thereof in the user metadata database 116.

Figure 2:
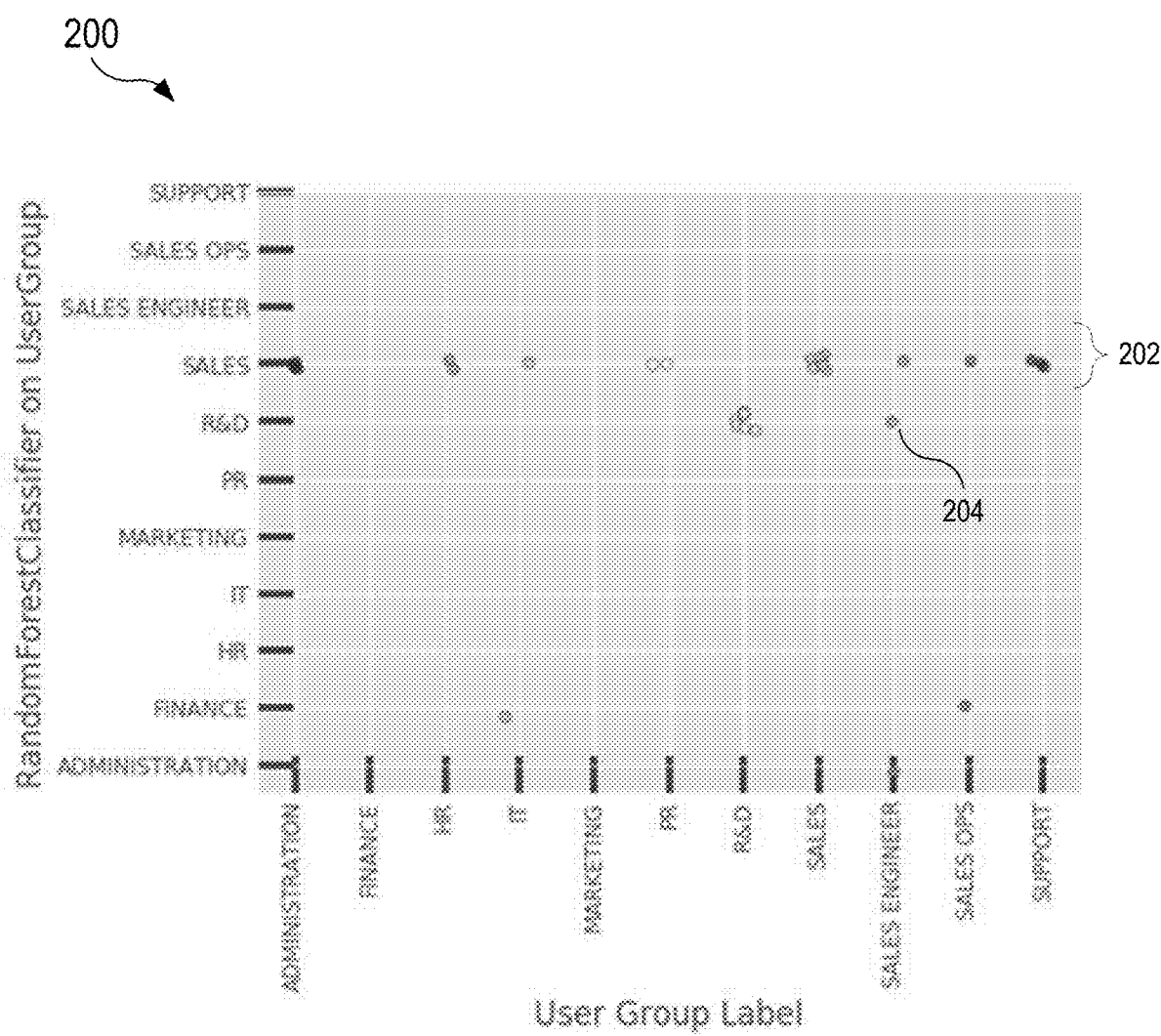
FIG. 2 is a graphical diagram illustrating a clustering of users and their associated user types to one clustering approach.

FIG. 2 is a graphical diagram illustrating a clustering of users and their associated user types to one clustering approach. As shown in graph 200 of FIG. 2, current methods for clustering have been determined to misidentify many user types. With the exception of the user types of "Sales" and "R&D", all other user types have been misidentified by conventional clustering techniques ("RandomForestClassifier"). For example, a plurality of users 202 classified as "Sales", in fact, should be classified as users associated with Administration, HR, IT, PR, Sales Engineer, Sales Ops, and Support user types. In another example, another user 204 classified as "R&D" should be classified as a user associated with Sales Engineer, instead.

Referring back to FIG. 1, the user metadata analytics service 114 may be configured to analyze the user metadata and generate clustering and grouping predictions and recommendations associated with the users. In some aspects, the user content metadata service 112 may be a part of the user metadata analytics service 114, for example, as separate or integrated modules of a software application, or may be separately running applications (e.g., daemons). In one implementation, the user metadata analytics service 114 includes a user metadata table read script configured to access the metadata database 116. The user metadata analytics service 114 may be further implemented using a user metadata feature/attribute engineering script configured to select and construct one or more user "features", which refers to attributes of the users and their associated metadata used in recognizing clustering of the users according to machine learning techniques. The user metadata analytics service 114 is further configured to write such selected user features to a table (e.g., UserFeature table) in the metadata database 116.

In some aspects, the user metadata analytics service 114 may be configured to predict one or more similar user groups (SMGs) in an organization. The user metadata analytics service 114 further include machine learning (ML) scripts for determining user clustering, and a machine learning script for user group classifier modeling. The user metadata analytics service 114 may be configured to perform SMG prediction of unknown (or new) users and/or user devices, and write predicted results to a table (e.g., SMG table) in the database 116.

In one aspect, the storage application 118 may be configured to perform any one of data storage, data protection, data security, and/or data backup according to the determined user group classification-based policies as determined by the user metadata analytics service 114. For example, the storage application 118 may set a group data storage and protection policy for a plurality of users clustered/grouped based on matching user fingerprints (described below). That is, the storage application 118 may set a different group data storage and protection policy for another different, cluster of users. In another example, the storage application 118 may provide data storage and protection services according to a common data storage and protection policy set for a cluster of users across multiple corporations and organizations, that is, a common cluster even though the group of users spans across different corporations or organizations. In yet another example, the storage application 118 may identify scenarios of user device redundancy, whereby a new user device's fingerprint is the same as a pre-existing user device in the same cluster or group. In such cases, the storage application 118 may characterize this as a duplicate case, as likely both user devices belong to the same user.

Figure 3:
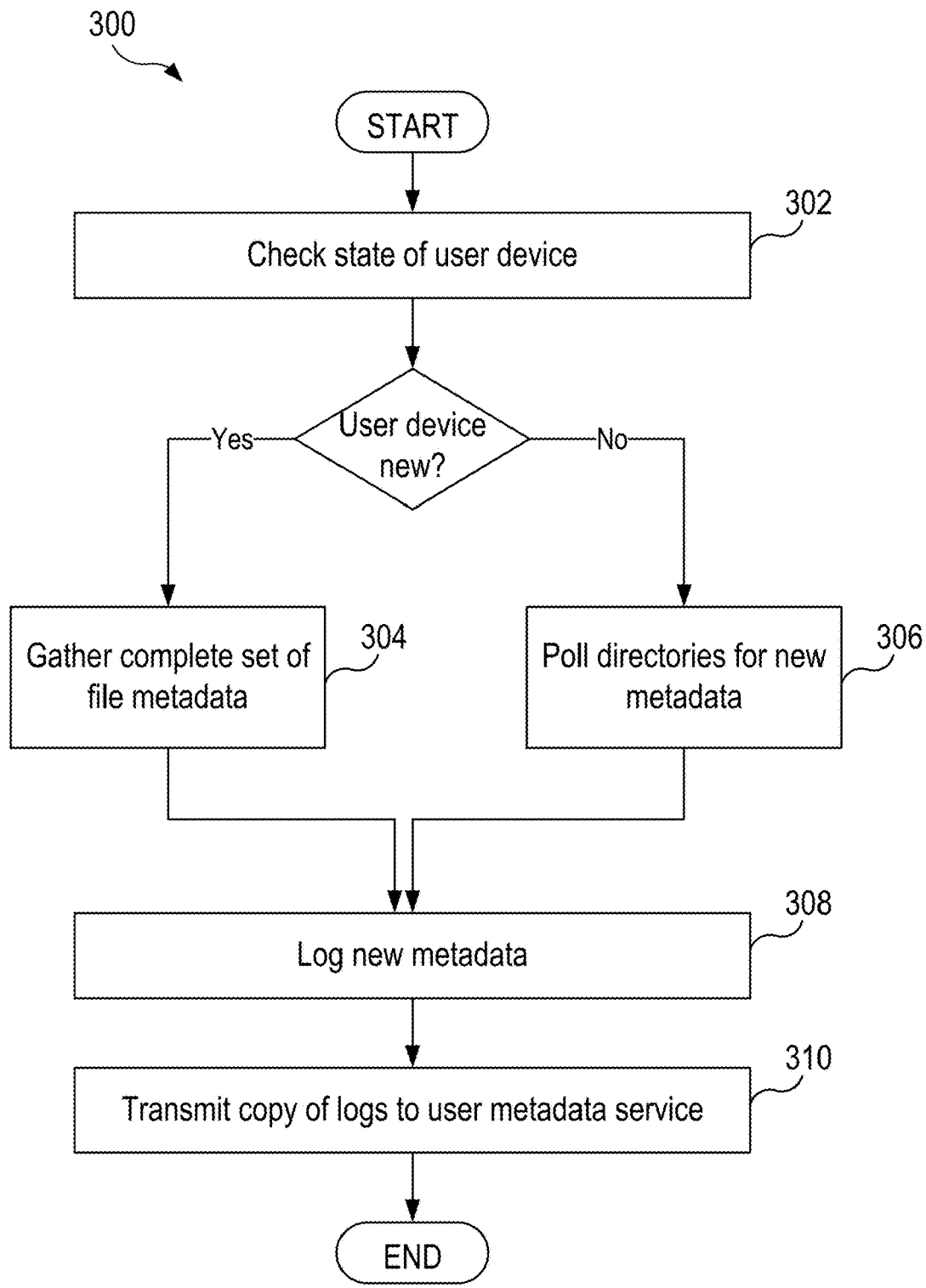
FIG. 3 is a flowchart illustrating a method for gathering user metadata by a user device according to an exemplary aspect.

FIG. 3 is a flowchart illustrating a method 300 for gathering user metadata by a user device according to an exemplary aspect. It is noted that the following description of the exemplary method makes reference to the system and components described above.

The method 300 begins at step 302, in which the metadata agent 104 (e.g., executing on a user device 102) checks the state of the user device 102 and gathers user file metadata 107. In some aspects, responsive to determining that the user device 102 is new (i.e., has not been previously checked or scanned by the system), at step 304, the metadata agent 104 may gather a complete set of file metadata 107 stored on the user device. Responsive to determining that the user device 102 is old, at step 306, the metadata agent 104 may poll one or more directories within a filesystem of the user device for new metadata, such as metadata that has been added or updated since the prior check of the user device's state. In some aspects, the metadata agent 104 may mark directories as read or maintain a last-checked timestamp for directories of the filesystem. At step 308, the metadata agent 104 logs the newly obtained metadata, for example, in a metadata log file. At step 310, the metadata agent 104 transmits a copy of one or more metadata logs to the user content metadata service 112 executing on the server system 110.

Figure 4:
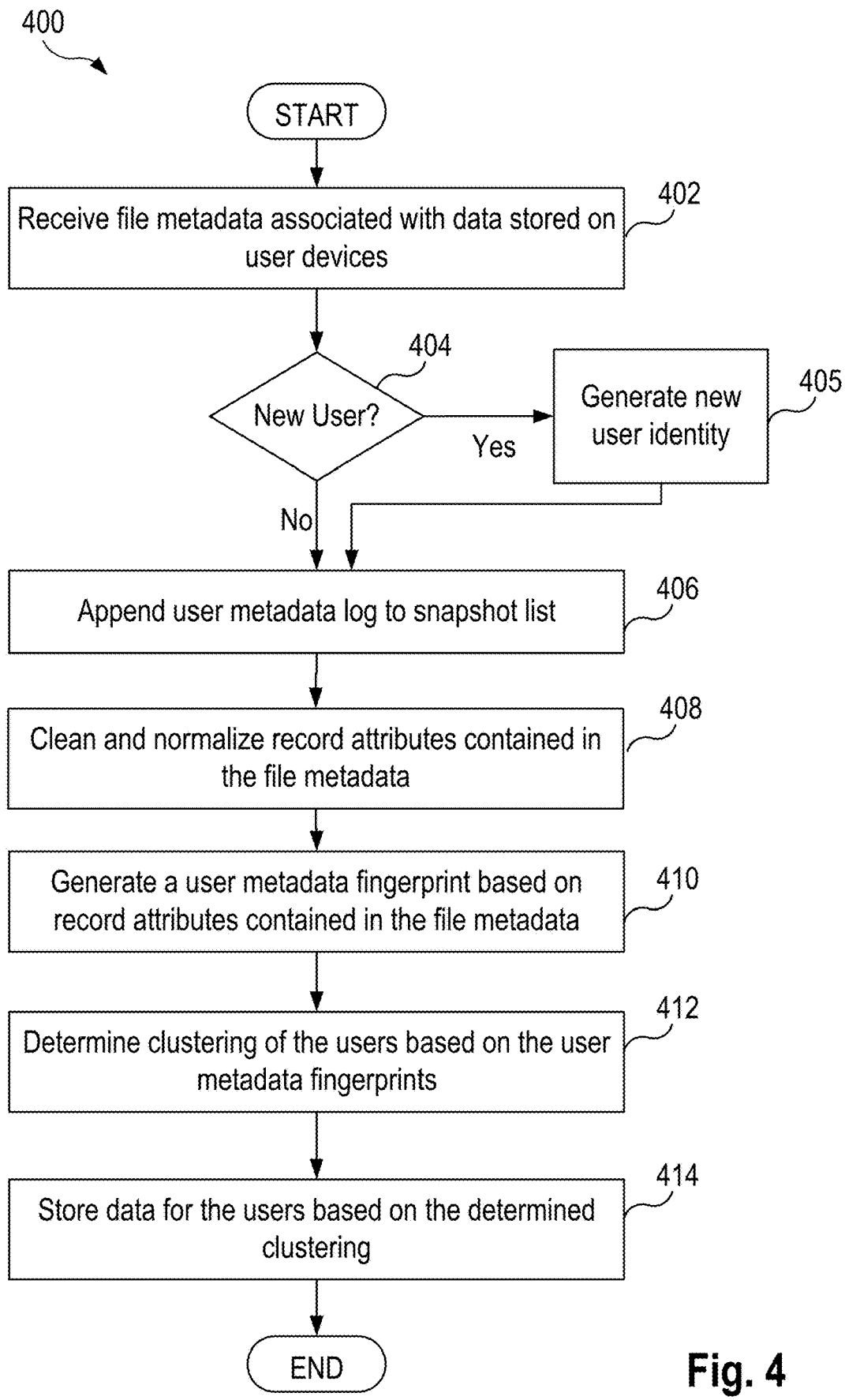
FIG. 4 is a flowchart illustrating a method for managing user data in a plurality of user devices according to an exemplary aspect.

FIG. 4 is a flowchart illustrating a method 400 for managing user data in a plurality of user devices according to an exemplary aspect. It is noted that the following description of the exemplary method makes reference to the system and components described above.

The method 400 begins at step 402, in which the user content metadata service 112 receives, from a plurality of user devices 102, file metadata 107 associated with data (e.g., files 106) stored on the plurality of user devices 102 associated with a plurality of users. The user content metadata service 112 records, per user device, log snapshots in the metadata database 116.

In some aspects, at step 404, the user content metadata service 112 may check whether a received metadata log is associated with a new user or an existing user. If new, a new user identity is generated; otherwise, at step 406, the user metadata service 112 appends the log to a snapshot list for that user. For example, at step 405, responsive to determining a (first) file metadata log received from a (first) user device is associated with a new user, the user content metadata service 112 generates a new user identity associated with the first user device, and adds the first file metadata log to a snapshot list (as a first element). Responsive to determining the first file metadata log received from the first user device is associated with an existing user, the user content metadata service 112 appends the first file metadata log to a list of snapshots associated with the first user device.

The user content metadata service 112 may send the appended user snapshots to the user metadata analytics service 114. In some aspects, the user metadata analytics service 114 receives the user metadata records, and if new user metadata record attributes are identified.

At step 408, the user metadata analytics service 114 cleans and normalizes record attributes contained in the file metadata. In some aspects, as part of the preparation of the record attributes, the user metadata analytics service cleans the user metadata record attributes according to machine learning techniques. The user metadata analytics service may then join user records in the table of user records (e.g., database 116). In some aspects, the user metadata analytics service normalizes the user attributes to standardize a range of variables or features of the user attributes, according to machine learning techniques also referred to as feature scaling.

At step 410, the user metadata analytics service 114 generates a user metadata fingerprint based on a plurality of user metadata record attributes contained in the file metadata. In some aspects, users working in a same local environment have similar user metadata fingerprints, while users working in a different environment have dissimilar user metadata fingerprints. Users working in similar (but not the same) environments may have user metadata fingerprints with a degree of similarity. Accordingly, the user metadata fingerprints may be used to model clustering users into similar user groups. The user metadata fingerprints may include either features directly extracted out of user metadata record attributes or by engineering new features which are computed by combining two or more features in a linear/non-linear way.

At step 412, the user metadata analytics service 114 determines clustering of the plurality of users based on the generated user metadata fingerprint. In some aspects, the user metadata analytics service performs clusters on a user table in the database 116 using a clustering algorithm or cluster analysis technique described herein, or other suitable clustering techniques. In some aspects, the user metadata analytics service may perform cluster validation on the determined clusters of the user devices.

The user metadata analytics service 114 may run one or more machine learning algorithms, which could either utilize clustering techniques such as K-Means, RandomForest-Classifier (and others available in literature) or clustering based a new approach to estimate differences between user metadata fingerprints where existing clustering methods fails to differentiate between user metadata fingerprints.

One such example is a rate of change of user metadata fingerprint features in relation to user file creation, user file modification, or user file access. In some aspects, the basis for clustering algorithm may be the type of files (as specified by file extensions) accessed, created, or modified by a particular user over a given period of time. For example, the user metadata analytics service 114 may generate a count of user metadata fingerprints having a certain file type (e.g., "*.doc", "*.ppt") associated with a particular user during a certain time period, and use such counts as a basis for a clustering metric. An example relationship between user metadata fingerprint features and a user is represented by Equation (1) below.

$$\text{Value}(user, Extn) = \log_2\left(N_{user_{Extn}} \sum_{i=1}^{N} \frac{1}{t_{A(i)_{Extn}}}\right) \quad (1)$$

The "Value(user,Extn)" implies a new feature for clustering or differentiation. The "user" in Equation (1) below represents an individual PC identity and "Extn" represents a user file/document extensions (e.g. doc, ppt, mp4, cpp, jpg etc.). The variable $N_{user,Extn}$ may represent a plurality of counts of specific extensions for a specific user aggregated over a file's respective time. The "value" can either be used as new feature for training against the target with improved accuracy, or the value can independently be used as distance metric to be trained against user targets.

In aspects where the "value" is used as a distance metric, additional steps were taken to compute centers and range of group in cluster first and afterwards used centers and ranges as parameters for clustering. In some aspects, the user metadata analytics service 114 may determine clustering of the users by applying a clustering algorithm to the generated user metadata fingerprints that uses the Equation (1) as a distance metric. For example, the user metadata analytics service 114 may apply, to the fingerprint values, a k-means clustering algorithm configured to partition the plurality of users into k clusters in which each user belongs to a cluster with the "nearest" mean, where a distance metric (for purposes of characterizing "near") is calculated according to the Equation (1) seen above.

Figure 5:
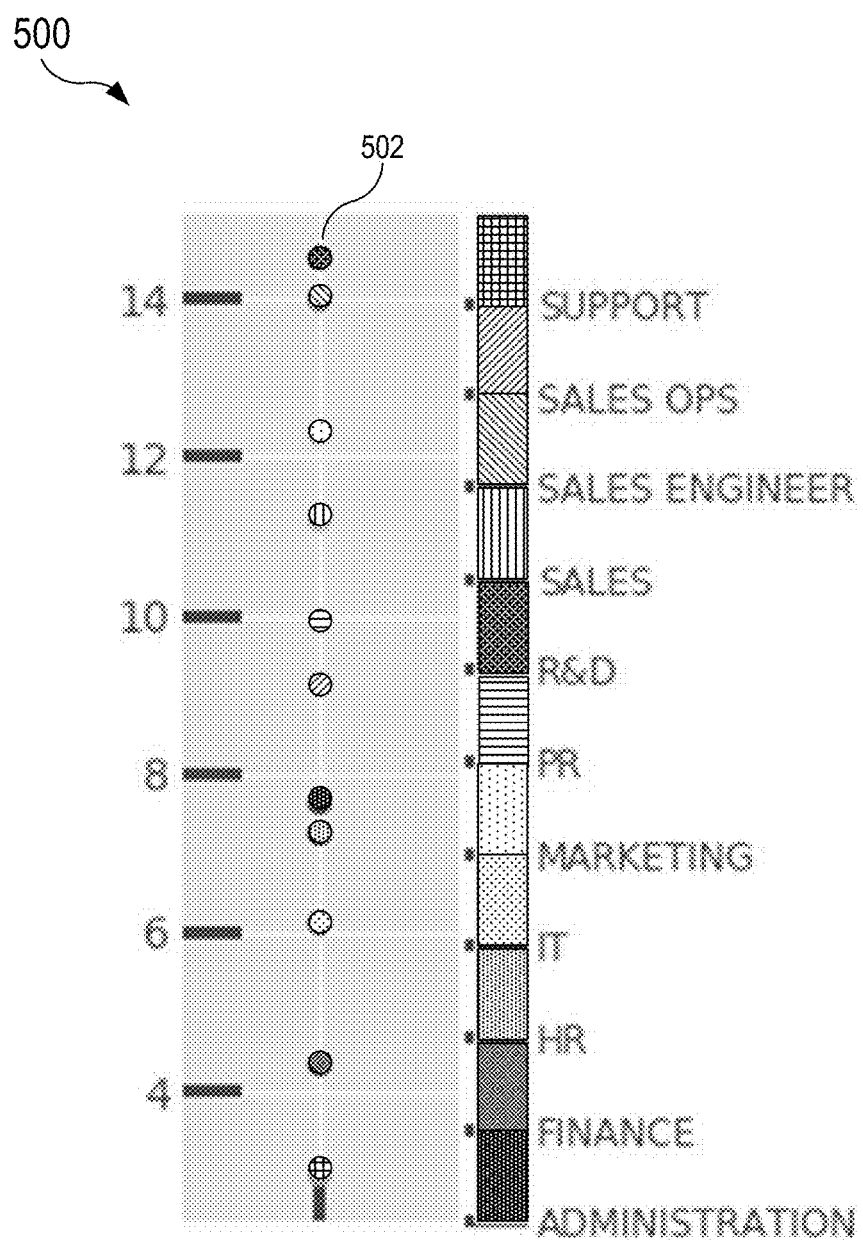
FIG. 5 is a graphical diagram depicting a plurality of user types having centers calculated based a distance metric, according to an exemplary aspect.

FIG. 5 is a graphical diagram depicting a plurality of user types having centers calculated based a distance metric, according to an exemplary aspect. The graph 500 includes a plurality of user types, such as Support, Sales Ops, Sales Engineer, Sales, R&D, PR, Marketing, IT, HR, Finance, and Administration. The graph 500 includes one or more data points 502 associated with each cluster of users at a respective count of users within the group and grouped with a nearest user as calculated according to a distance metric. Here, the x-axis of graph 500 reflects user types and y-axis shows corresponding value scores for different user types. The metric (value score) is used to compute a unique score for each user type group and at the same time maximize the gap between two neighboring user types.

The user metadata analytics service may perform user cluster labeling to select descriptive labels to each of the determined clusters or groups. The user cluster labeling may be based on organizational structures (e.g., HR, Sales, and other departments) or on users' roles (e.g., Analysts, Executives, Developers, etc.). In some aspects, the user cluster labeling may be based on informational needs, for example, users that generate large amounts of data (e.g., "High Storage"), users that require strict data retention policies for compliance (e.g., "Data Retention"), etc. In some aspects, the user metadata analytics service may perform user cluster/group label modelling to automatically generate a label that summarizes the group of users. For example, the user metadata analytics service may use classification techniques to label a cluster by comparing term distributions, and apply regression techniques (e.g., linear regression) to combine and optimize label scores. In some aspects, the user metadata analytics service may then perform user cluster/group validation.

In one aspect, the user metadata analytics service 114 saves the model/predictor with input data structure details. The model/predictor may be a model generated by the user metadata analytics service to predictively associate a given user with a particular cluster(s). The user metadata analytics service may send the model/predictor to the user content metadata service 112.

In some aspects, the generated model/predictor may be implemented as a service configured to perform cluster/group prediction of a given user based on the corresponding metadata fingerprint. In some aspects, if the model/predictor is new, the user metadata analytics service copies the model/predictor with a creation timestamp. If being updated, the user metadata analytics service replaces the model/predictor with an update timestamp.

Referring back to FIG. 4, at step 414, the storage application 118 stores data for the plurality of users based on the determined clustering. In some aspects, the storage application 118 determines a group data storage and protection policy for the plurality of user devices based on the determined clustering, and uses that policy to manage the data stored for the plurality of users. In some aspects, the determined clustering may include plurality of clusters of user devices across multiple corporations and organizations. In such an aspect, the storage application 118 may identify similar metadata across the multiple corporations, determine a common data storage and protection policy, and store up the data of the plurality of user devices based on the common data storage and protection policies. In some aspects, the storage application 118 may determine that that a user metadata fingerprint associated with a new user device matches an existing user metadata fingerprint associated with a first user device in a same cluster, and, in response, determine that the new user device belongs to a same user as the first user device.

Figure 6:
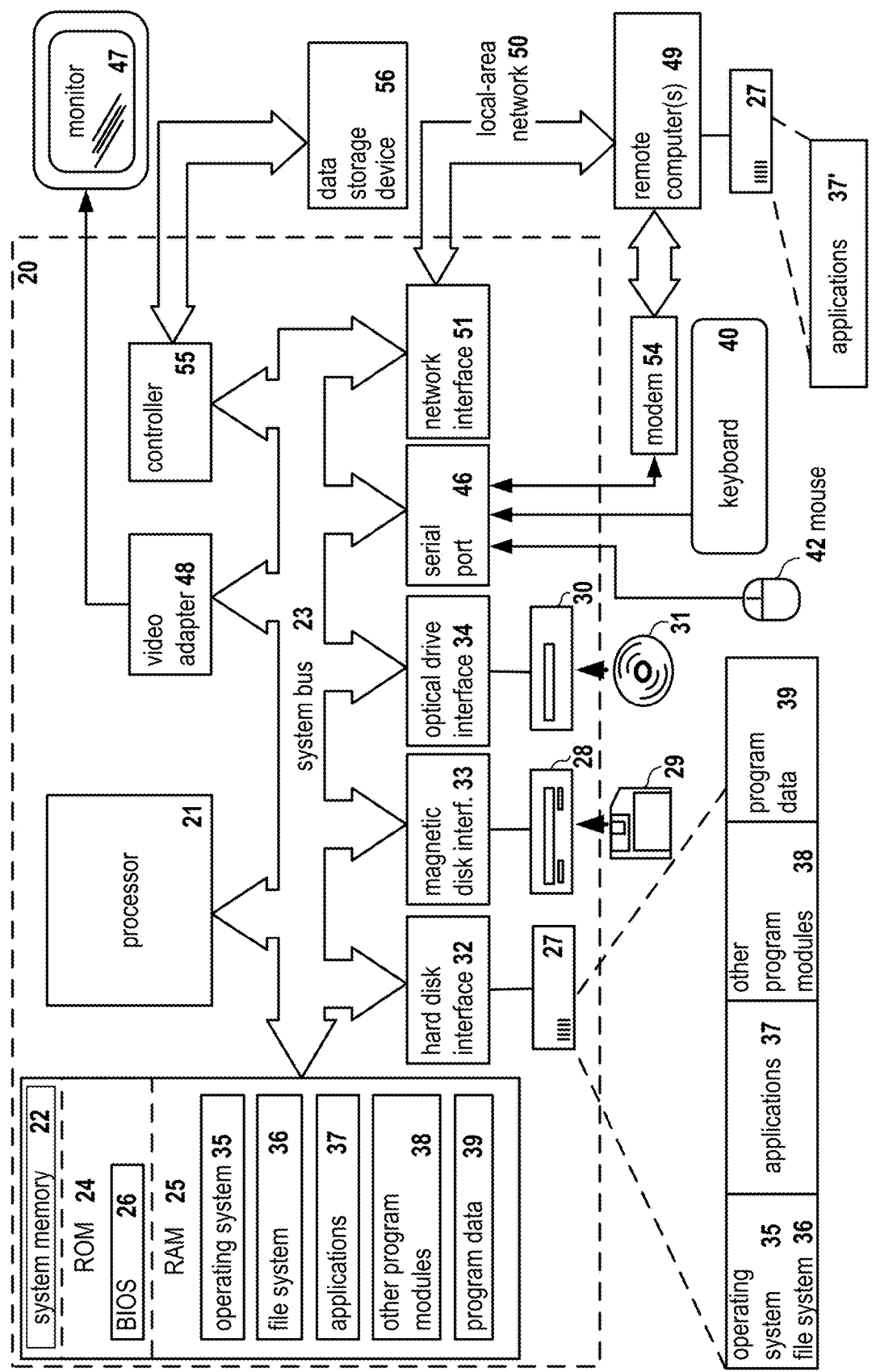
FIG. 6 is a block diagram of a general-purpose computer system on which the disclosed system and method can be implemented according to an exemplary aspect.

FIG. 6 is a block diagram illustrating a general-purpose computer system 20 on which aspects of systems and methods for managing user data in a plurality of user devices may be implemented in accordance with an exemplary aspect. It should be noted that the computer system 20 can correspond to the user devices 102 and server system 110, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are powerindependent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for managing user data in a plurality of user devices, wherein the method comprises:

receiving, from a plurality of user devices utilizing a data service under a global data storage and protection policy, file metadata associated with data stored on the plurality of user devices associated with a plurality of users;

generating user metadata fingerprints based on a plurality of user metadata record attributes contained in the file metadata;

determining a plurality of user clusters comprising the plurality of users based on the generated user metadata fingerprints, wherein each user cluster of the plurality of user clusters comprises a different group of users in the plurality of users;

assigning, from a plurality of data storage and protection policies, a new respective data storage and protection policy to each user device of a respective user cluster of the plurality of user clusters, wherein the assigning is based on whether a new respective data storage and protection policy corresponds to usage attributes of the data service by a respective user cluster, and wherein each new respective data storage and protection policy is unique to each respective user cluster to meet individual work requirements of the respective user cluster; and storing data for each user device of the plurality of user devices in accordance with the new respective data storage and protection policy.

2. The method of claim 1, wherein the plurality of user metadata record attributes is cleaned, normalized, and joined to a database of user records.

3. The method of claim 1, further comprising:
responsive to determining a first file metadata log received from a first user device is associated with a new user, generating a new user identity associated with the first user device; and
responsive to determining the first file metadata log received from the first user device is associated with an existing user, appending the first file metadata log to a list of snapshots associated with the first user device.

4. The method of claim 1, further comprising:
responsive to determining that a user metadata fingerprint associated with a new user device matches an existing user metadata fingerprint associated with a first user device in a same cluster, determining that the new user device belongs to a same user as the first user device.

5. A system for managing user data in a plurality of user devices, wherein the system comprises:
a storage device configured to store a metadata database; and
a hardware processor configured to:
receive, from a plurality of user devices utilizing a data service under a global data storage and protection policy, file metadata associated with data stored on the plurality of user devices associated with a plurality of users;
generate user metadata fingerprints based on a plurality of user metadata record attributes contained in the file metadata;
determine a plurality of user clusters comprising the plurality of users based on the generated user metadata fingerprints, wherein each user cluster of the plurality of user clusters comprises a different group of users in the plurality of users;
assign, from a plurality of data storage and protection policies, a new respective data storage and protection policy to each user device of a respective user cluster of the plurality of user clusters, wherein the assigning is based on whether a new respective data storage and protection policy corresponds to usage attributes of the data service by a respective user cluster, and wherein each new respective data storage and protection policy is unique to each respective user cluster to meet individual work requirements of the respective user cluster; and
store data for each user device of the plurality of user devices in accordance with the new respective data storage and protection policy.

6. The system of claim 5, wherein the plurality of user metadata record attributes is cleaned, normalized, and joined to a database of user records.

7. The system of claim 5, wherein the processor is further configured to:
responsive to determining a first file metadata log received from a first user device is associated with a new user, generate a new user identity associated with the first user device; and
responsive to determining the first file metadata log received from the first user device is associated with an existing user, append the first file metadata log to a list of snapshots associated with the first user device.

8. The system of claim 5, wherein the processor is further configured to:
responsive to determining that a user metadata fingerprint associated with a new user device matches an existing user metadata fingerprint associated with a first user device in a same cluster, determine that the new user device belongs to a same user as the first user device.

9. A non-transitory computer readable medium comprising computer executable instructions for managing user data in a plurality of user devices, including instructions for:
receiving, from a plurality of user devices utilizing a data service under a global data storage and protection policy, file metadata associated with data stored on the plurality of user devices associated with a plurality of users;
generating user metadata fingerprints based on a plurality of user metadata record attributes contained in the file metadata;
determining a plurality of user clusters comprising the plurality of users based on the generated user metadata fingerprints, wherein each user cluster of the plurality of user clusters comprises a different group of users in the plurality of users;
assigning, from a plurality of data storage and protection policies, a new respective data storage and protection policy to each user device of a respective user cluster of the plurality of user clusters, wherein the assigning is based on whether a new respective data storage and protection policy corresponds to usage attributes of the data service by a respective user cluster, and wherein each new respective data storage and protection policy is unique to each respective user cluster to meet individual work requirements of the respective user cluster; and
storing data for each user device of the plurality of user devices in accordance with the new respective data storage and protection policy.

10. The computer readable medium of claim 9, wherein the plurality of user metadata record attributes is cleaned, normalized, and joined to a database of user records.

11. The computer readable medium of claim 9, further comprising instructions for:
responsive to determining a first file metadata log received from a first user device is associated with a new user, generating a new user identity associated with the first user device; and
responsive to determining the first file metadata log received from the first user device is associated with an existing user, appending the first file metadata log to a list of snapshots associated with the first user device.

12. The computer readable medium of claim 9, further comprising instructions for:
responsive to determining that a user metadata fingerprint associated with a new user device matches an existing user metadata fingerprint associated with a first user device in a same cluster, determining that the new user device belongs to a same user as the first user device.

* * * * *